US006502059B1

(12) United States Patent
Filev et al.

(10) Patent No.: US 6,502,059 B1
(45) Date of Patent: Dec. 31, 2002

(54) METHOD OF DETERMINING WAVEFORM STABILITY FOR PULSE ECHO LAYER THICKNESS TRANSDUCER

(75) Inventors: Dimitar P. Filev, Novi, MI (US); Frank Migda, Commerce Township, MI (US); Sunil Bharitkar, Los Angeles, CA (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/561,552

(22) Filed: Apr. 28, 2000

(51) Int. Cl.[7] ................. G01B 11/02; G01B 13/02; G01B 5/02; G01B 7/02; G01B 15/00
(52) U.S. Cl. .............................. 702/171; 702/170
(58) Field of Search ................... 702/170, 171

(56) References Cited

U.S. PATENT DOCUMENTS

| | | | | |
|---|---|---|---|---|
| 3,925,650 A | * | 12/1975 | Brown | 235/164 |
| 4,043,181 A | * | 8/1977 | Nigam | 73/67 |
| 4,114,136 A | * | 9/1978 | D'Albora | 340/3 |
| 4,953,147 A | * | 8/1990 | Cobb | 367/35 |
| 5,038,615 A | * | 8/1991 | Trulson et al. | 367/100 |
| 5,043,927 A | * | 8/1991 | Jackson | 364/551.01 |
| 5,091,647 A | * | 2/1992 | Carduner et al. | 250/341 |
| 5,446,333 A | * | 8/1995 | Ishida et al. | 310/334 |
| 5,448,503 A | * | 9/1995 | Morris et al. | 364/550 |
| 5,608,165 A | * | 3/1997 | Mozurkewich, Jr. | 73/599 |
| 5,974,886 A | * | 11/1999 | Carroll et al. | 73/598 |
| 6,067,059 A | * | 5/2000 | Chen | 345/32 |

OTHER PUBLICATIONS

SAE Paper No. 860109, "The Relative Effect of Paint Film Thickness on Bimetallic and Crevice Corrosion", Jan. 1, 1986. Vincent, S.S.; Coon, C. L.

SAE Paper No. 950002, "Liquid Film Thickness Measurements by Means of Internally–Reflected Light"., Feb. 1, 1995, Evers, Lawrence W; Jackson, Kenneth J.

* cited by examiner

Primary Examiner—John S. Hilten
Assistant Examiner—Aditya Bhat
(74) Attorney, Agent, or Firm—Damian Porcari

(57) ABSTRACT

A method is provided of determining waveform stability of a pulse echo layer transducer (PELT) used for measuring paint film thickness of painted bodies. The method includes the steps of reading a signal with the PELT transducer with respect to a desired location of the vehicle. The method also includes the steps of determining whether a maximum absolute value of the read signal is greater than a noise threshold ($\phi$) and computing a measure ($\rho$) based on an option (k). The method includes the steps of determining whether the computed measure ($\rho$) is above or below a predetermined threshold (T) based on the option (k), and concluding a stable/unstable signal from the PELT transducer.

19 Claims, 2 Drawing Sheets

METHOD OF DETERMINING WAVEFORM STABILITY FOR PULSE ECHO LAYER THICKNESS TRANSDUCER

BACKGROUND OF THE INVENTION

1. Field of the Invention

The present invention relates generally to paint film thickness of painted bodies and, more specifically, to a method of determining waveform stability for a pulse echo layer thickness transducer used for measuring paint film thickness of painted bodies.

2. Description of the Related Art

The application of paint to a body of a vehicle is a sensitive process. The quality, durability and color matching of the paint are critical in producing a high quality product, and therefore require significant quality control efforts. Generally, paint film thickness is monitored by use of hand-held sensors, such as an ultrasonic pulse echo layer thickness (PELT) transducer. These sensors are handled by an operator who must manually apply the sensor against the surface of the painted body of the vehicle in a position normal to the surface at a plurality of locations on the surface to measure the paint film thickness. In the performance of this measurement, it is highly important that the operator position the sensor normal to the particular location being sensed, and it is also critical that the operator position the sensor consistently at the same plurality of locations on the surface being sensed. Errors in the angle of the sensor relative to the surface or in the location of the sensor on the surface can adversely affect quality control. Because a significant reliance is placed upon the operator, a significant amount of error is introduced in the quality control process.

The PELT transducer used for paint film thickness measurements receives signals from successive paint layers. Determining the stability of the signals that are reflected by the paint layers is important before any thickness measurements are conducted using the PELT transducer. A waveform is considered to be stable if a measure used for comparing two successive waveforms exceeds a certain threshold, and the measure does not change significantly over a series of successive waveforms. Previously, human judgment was used as a determining factor for identifying a possible stable waveform on the PELT transducer.

As a result, it is desirable to provide a method for determining as to when signals from a PELT transducer have reached steady state under the given specifications automatically. It is also desirable to provide a method for determining waveform stability for a PELT transducer used for measuring paint film thickness on a painted body of a vehicle. It is further desirable to provide a systematic method for determining stabilization of signals reflected from paint layers of a vehicle body using a PELT transducer.

SUMMARY OF THE INVENTION

Accordingly, the present invention is a method of determining waveform stability for a pulse echo layer thickness (PELT) transducer used for measuring paint film thickness of painted bodies on a vehicle. The method includes the steps of reading a signal with the PELT transducer with respect to a desired location of the vehicle. The method also includes the steps of determining whether a maximum absolute value of the read signal is greater than a noise threshold ($\phi$) and computing a measure ($\rho$) based on an option (k). The method includes the steps of determining whether the computed measure ($\rho$) is above or below a predetermined threshold (T) based on the option (k), and concluding a stable/unstable signal from the PELT transducer.

Some of the associated advantages with the method of the present invention include automatic waveform stability detection, fast and accurate performance, enhanced ergonomics (no need for visual information) if used by a human operator, and easily implementation in a robotic sensor.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
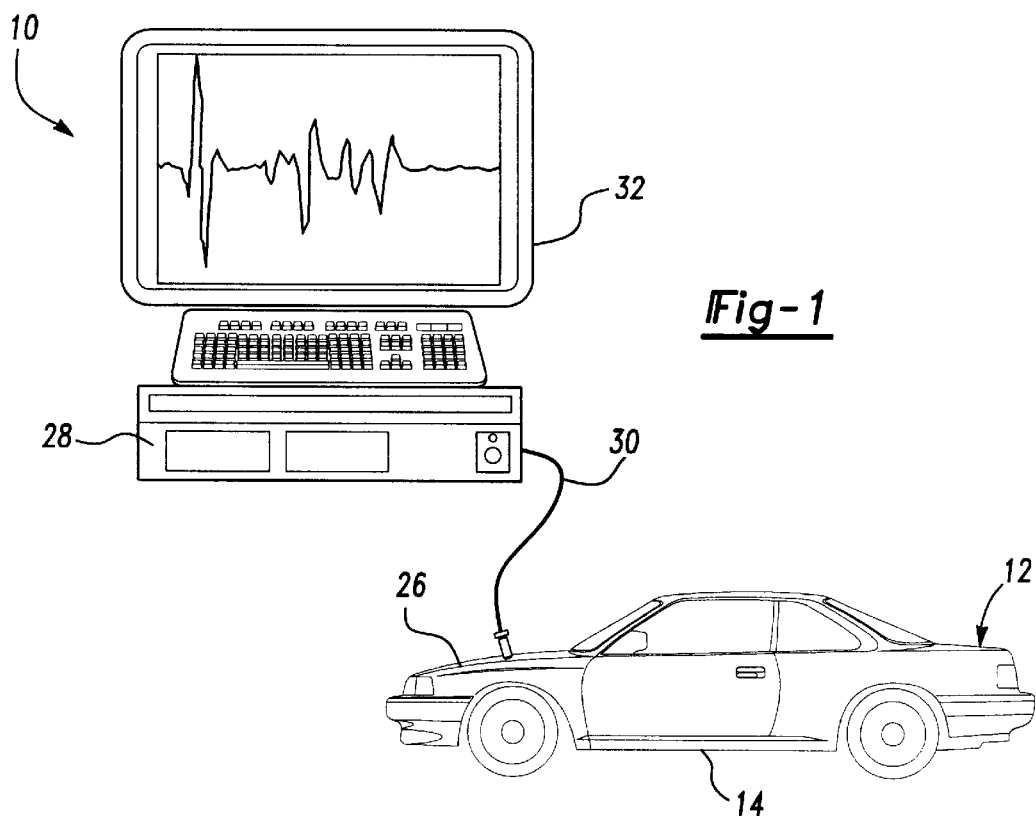
FIG. 1 is a diagrammatic view of a pulse echo layer thickness (PELT) system on which the present invention is implemented illustrated in operational relationship with a vehicle.
Figure 2:
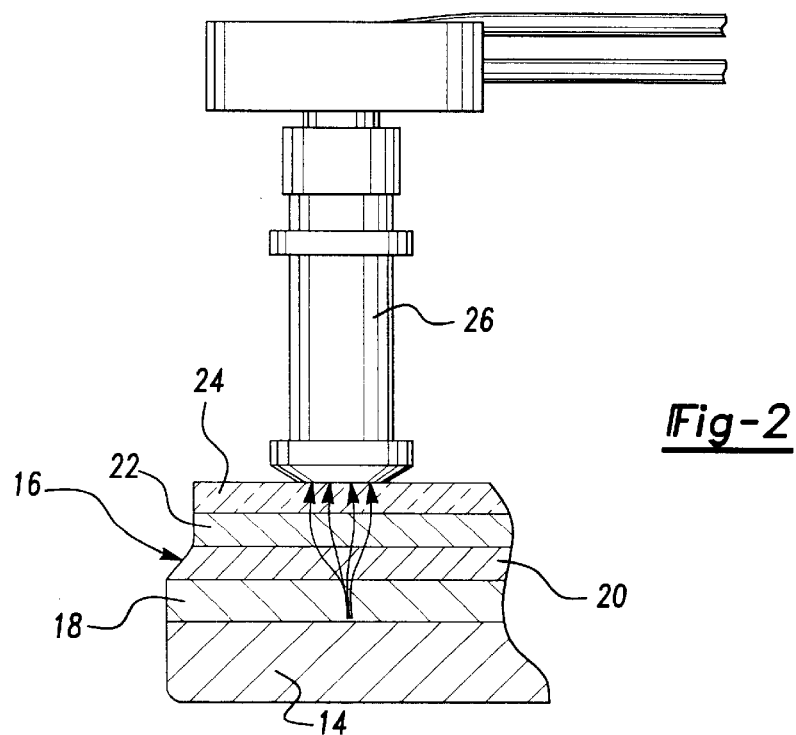
FIG. 2 is plan view of a pulse echo layer thickness (PELT) transducer of the PELT system and vehicle of FIG. 1.

Referring to the drawings and in particular FIGS. 1 and 2, one embodiment of pulse echo layer thickness (PELT) system 10 is illustrated in operational relationship with a vehicle such as an automotive vehicle, generally indicated at 12. The vehicle 12 has a vehicle body 14 covered with paint, generally indicated at 16. The paint 16 has a plurality of layers and includes an E-coat layer 18 over the vehicle body 14, a primer layer 20 over the E-coat layer 18, a basecoat layer 22 over the primer layer 20 and a clearcoat layer 24 over the basecoat layer 22. It should be appreciated that the layers 18 through 22 may have various thicknesses. It should also be appreciated that the paint 16, vehicle body 14 and vehicle 12 are conventional and known in the art.

The PELT system 10 includes a PELT transducer 26 for measuring the film thickness of the layers 18 through 22 of the paint 16. The PELT transducer 26 is of an ultrasonic type as known in the art. The PELT transducer 26 may be mounted to a robot arm (not shown). The PELT system 10 also includes a signal processor 28 such as a high frequency ultrasonic pulser/receiver with digitizer electrically connected to the PELT transducer 26 by suitable means such as a wire or cable 30. The PELT system 10 further includes a host computer system 32 such as a laptop computer electrically connected to the signal processor 28 by suitable means such as a cable (not shown). The computer system 32 includes a computer having a memory, a processor, a display and user input mechanism, such as a mouse or keyboard. It should be appreciated that a method, according to the present invention, is a software program stored on the computer system 32 to be carried out on the computer system 32 as subsequently described.

In operation of the PELT system 10, an operator holds the PELT transducer 26 against the paint 16 and normal to the vehicle body 14. The signal processor 28 generates ultrasonic signals that travel through the cable 30 and PELT transducer 26 and are reflected by the vehicle body 14 through the paint 16 and received by the PELT transducer 26. The received signals travel through the PELT transducer 26 and cable 30 to the signal processor 28. The signal processor 28 processes the signals, which are sent to the computer system 32 and displayed as a waveform. When the operator looks at the display and determines that the waveform of the signal is stable, the operator actuates an input device such as a key on the keyboard and captures the signal, which is used to determine the thickness of the paint 16 by a computer program as known in the art. It should also be appreciated that, except for the method to be described, the PELT system 10 is conventional and known in the art.

Figure 3:
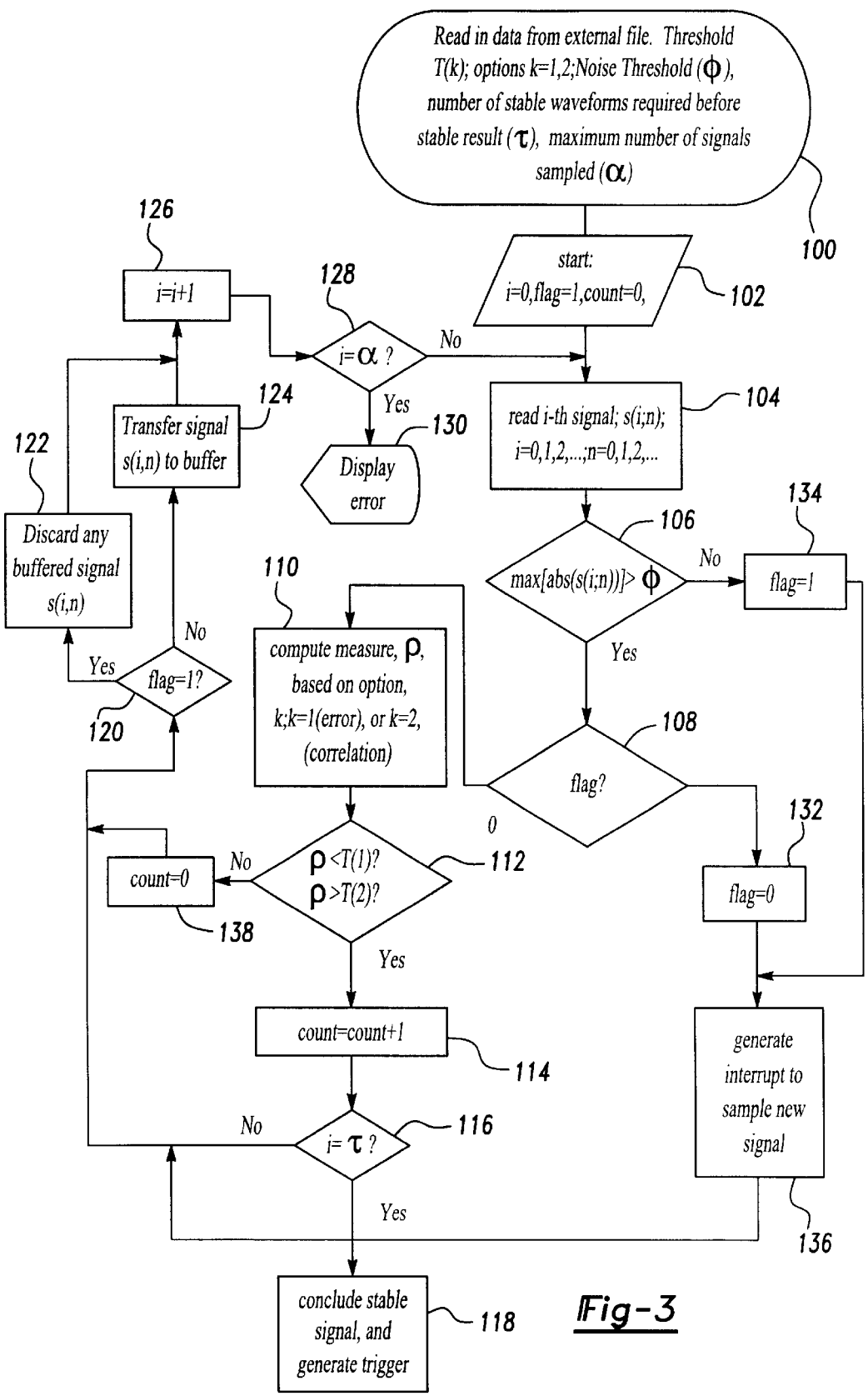
FIG. 3 is a flowchart of a method, according to the present invention, of determining waveform stability for the PELT transducer of FIGS. 1 and 2.

Referring to FIG. 3, a method, according to the present invention, of determining waveform stability in the PELT transducer 26 is shown. In the present invention, the method starts in bubble 100 and reads in data from an external file. The external file may be stored on a server memory, memory of the computer system 32, a magnetic disk storage device, or any one of numerous other electronic or magnetic storage devices. The data in the external file includes a predetermined threshold (T(k)) which is a confidence level of a stable signal from the PELT transducer 26, options (k=1,2) to be described, noise threshold ($\phi$), number of stable waveforms required before stable result ($\tau$) of the signal from the PELT transducer 26, and maximum number of signals sampled ($\alpha$) from the PELT transducer 26. The method then advances to block 102.

Next, in block 102, the method starts by setting variables such as a waveform number (i) equal to a predetermined value such as zero, flag equal to a predetermined value such as one and count equal to a predetermined value such as zero. The method advances to block 104 and reads i-th signal s(i,n). The method samples signals from the PELT transducer 26 where i is the waveform number and i=0,1,2, ... and n is the sample value and n=0,1,2, ... From block 104, the method advances to diamond 106 and determines whether a maximum absolute value of the signal s(i,n) is greater than the noise threshold ($\phi$). If so, the method advances to diamond 108 and determines whether the variable flag is equal to zero or one. If the flag is equal to zero, the method advances to block 110 and computes a measure ($\rho$) based on the option (k). If k=1, the measure ($\rho$) is computed based on error to be described. If k=2, the measure ($\rho$) is computed based on correlation to be described. The method then advances to diamond 112 and determines whether the computed measure ($\rho$) is less than the predetermined threshold (T) if the error option (k=1) is used or greater than the predetermined threshold (T) is the correlation option (k=2) is used.

In diamond 112, if the computed measure ($\rho$) is less than the predetermined threshold (T) for the error option (k=1) and greater than the predetermined threshold (T) for the correlation option (k=2), the method advances to block 114 and increments the variable count by a predetermined amount such as one to set count equal to count plus one. The method then advances to diamond 116 and determines whether the waveform number (i) is equal to the predetermined number of stable waveforms before a stable result ($\tau$). If so, the method advances to block 118 and concludes a stable signal from the PELT transducer 26 and generates automatically a trigger via the computer system 32 to capture the stable waveform. If not, the method advances to diamond 120 and determines whether the variable flag is equal to a predetermined number such as one.

In diamond 120, if the variable flag is equal to one, the method advances to block 122 and discards any buffered signal s(i,n). If the variable flag is not equal to one, the method advances to block 124 and transfer the signal s(i,n) to a buffer, which is an array stored in memory of the computer system 32. From blocks 122 and 124, the method advances to block 126 and increments the waveform number (i) by a predetermined amount such as one to set i equal to i plus one. The method then advances to diamond 128 and determines whether the waveform number (i) is equal to the maximum number of signals sampled ($\alpha$). If not, the method advances to block 104 previously described. If so, the method advances to block 130 and displays an error on the computer system 32.

In diamond 108, if the variable flag is equal to one, the method advances to block 132 and sets the variable flag equal to a predetermined value such as zero. In diamond 106, if the maximum absolute value of the signal s(i,n) is not greater than the noise threshold ($\phi$), the method advances to block 134 and sets the variable flag equal to a predetermined value such as one. From blocks 132 and 134, the method advances to block 136 and generates an interrupt to sample a new signal. The method then advances to diamond 120 previously described.

In diamond 112, if the computed measure ($\rho$) is not less than the predetermined threshold T for the error option (k=1) and greater than the predetermined threshold T for the correlation option (k=2), the method advances to block 138. In block 138, the method sets the variable count equal to a predetermined value such as zero. The method advances to diamond 120 previously described.

In the present invention, a waveform is considered stable if a measure used for comparing two successive waveforms exceeds a certain threshold and the measure does not change significantly over a series of successive waveforms. The present invention considers two possible measures, known as error and correlation. Both of these measures are normalized so that it would not be necessary to introduce different thresholds in different operating environments (i.e., differing signal amplitude levels and noise characteristics) because these issues are not considered in waveform sampling. Once a criteria for a stable waveform is satisfied, a trigger is generated automatically to capture the stable waveform. In the present invention, the following error based objective function measure is used to compare two sampled waveforms (each of length N), $$E_{i-1,i} = e^2 = \sum_{k=1}^{N} [y_{i-1}(k) - y_i(k)]^2 \tag{1}$$

The current and previous (sampled and stored) waveforms are indicated by the indices i, and i−1, respectively. The lower this measure, the higher is the possibility of the current waveform being in steady state. This measure is compared with a threshold and then determined if the waveform is stable or not. The error is normalized using the triangle inequality:

$$0 \leq \|\underline{a}+\underline{b}\|_2 \leq \|a\|_2 + \|b\|_2 \tag{2}$$

Thus, the normalized error is represented as:

$$E_{i-1,i}^{norm} = \frac{(\underline{y}_i - \underline{y}_{i-1})^T (\underline{y}_i - \underline{y}_{i-1})}{\left(\sqrt{\underline{y}_i^T \underline{y}_i} + \sqrt{\underline{y}_{i-1}^T \underline{y}_{i-1}}\right)^2} \tag{3}$$

It should be appreciated that the normalized error is a classical measure of performance, but is sensitive to scaling and may not be reliable in the presence of measurement noise.

In the present invention, the normalized correlation is similar to the measure used in geometry. It measures the collinearity between two vectors (the cosine of the angle between them), and the similar the waveforms, the smaller the angle is between the two vectors (here each vector is a waveform). Based on the correlation between two signals, the time correlation of the two signals is as follows:

$$\hat{r} = \underline{y}_{i-1}^T \underline{y}_i \tag{4}$$

Thus, $$E\{\hat{r}\} = E\{(s_1+n_1)^T(s_2+n_2)\} = s_1^T s_2 + \text{trace}(Q)$$

Dividing both sides of the above equation by trace (Q), this decision criteria involves a sort of SNR (signal to noise ratio), at steady state this measure would be the ratio of the signal power to the trace of the cross correlation of the noise vectors. The normalized version of the correlation is as follows:

$$r_{i-1,i} = \frac{\underline{y}_{i-1}^T \underline{y}_i}{\sqrt{\|\underline{y}_{i-1}\|_2^2} \sqrt{\|\underline{y}_i\|_2^2}} \tag{5}$$

It can be immediately observed that:

$$r_{i-1,i} \in [-1,1]$$

Thus, this correlation acts as a very general quality indicator, with 1 indicating perfect stability and −1 indicating instability. It should be appreciated that this measure is not sensitive to the effect of scaling and is a reliable measure in the presence of additive noise.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for determining waveform stability of a pulse echo layer thickness (PELT) transducer used for measuring paint film thickness of painted bodies, said method comprising the steps of:

reading a signal with the PELT transducer with respect to a desired location of the painted bodies;

determining whether a maximum absolute value of the read signal is greater than a noise threshold ($\phi$);

computing a measure based on an option;

determining whether the computed measure is above or below a predetermined threshold (T) based on the option; and concluding either a stable signal or an unstable signal from the PELT transducer.

2. A method as set forth in claim 1 including the step of reading in a predetermined threshold T(k).

3. A method as set forth in claim 1 including the step of reading in options (k=1,2).

4. A method as set forth in claim 1 including the step of reading in a noise threshold ($\phi$).

5. A method as set forth in claim 1 including the step of reading in a number of stable waveforms required before stable result ($\tau$).

6. A method as set forth in claim 1 including the step of reading in a maximum number of signals sampled ($\alpha$).

7. A method as set forth in claim 1 including the step of determining whether a flag has been set if the maximum absolute value of the read signal is greater than the noise threshold ($\phi$).

8. A method as set forth in claim 7 including the step of generating an interrupt to sample a new signal if the flag has not been set.

9. A method as set forth in claim 8 including the step of transferring the read signal to a buffer.

10. A method as set forth in claim 7 wherein said step of computing comprises computing the measure based on an error option or based on a correlation option if the flag has not been set.

11. A method as set forth in claim 10 wherein said step of determining comprises determining whether the computed measure ($\rho$) is less than a predetermined threshold (T) if the computed measure ($\rho$) is based on the error option (k=1) and greater than a predetermined threshold (T) if the computed measure ($\rho$) is based on the correlation option (k=2).

12. A method as set forth in claim 11 including the step of incrementing a count if the computed measure is less than the predetermined threshold (T) based on the error option or above the predetermined threshold (T) based on the correlation option.

13. A method for determining waveform stability of a pulse echo layer thickness (PELT) transducer used for measuring paint film thickness of painted bodies, said method comprising the steps of:

reading a signal with the PELT transducer with respect to a desired location of the painted bodies;

determining whether a maximum absolute value of the read signal is greater than a noise threshold;

determining whether a flag has been set if the maximum absolute value of the read signal is greater than the noise threshold;

computing a measure based on an error option or based on a correlation option if the flag has not been set;

determining whether the computed measure is less than a predetermined threshold if the computed measure is based on the error option and greater than a predetermined threshold if the computed measure is based on the correlation option;

incrementing a count if the computed measure is less than the predetermined threshold based on the error option or above the predetermined threshold based on the correlation option;

determining whether the waveform number is greater than a predetermined number of stable waveforms required before a stable result; and concluding either a stable signal or an unstable signal from the PELT transducer.

14. A method as set forth in claim 13 wherein said step of concluding comprises concluding a stable signal if the waveform number is equal to the predetermined number of stable waveforms required before a stable result ($\tau$).

15. A method as set forth in claim 13 including the step of determining whether the read signal is equal to a maximum number of signals sampled ($\alpha$).

16. A method as set forth in claim 15 including the step of indicating an error if the read signal is equal to the maximum number of signals sampled ($\alpha$).

17. A method as set forth in claim 15 including the step of reading a new signal if the read signal is not equal to the maximum number of signals sampled ($\alpha$).

18. A method as set forth in claim 12 including the step of discarding any buffered signal if the flag has been set.

19. A method for determining waveform stability of a pulse echo layer transducer (PELT) used for measuring paint film thickness of painted bodies, said method comprising the steps of:

reading a signal with the PELT transducer with respect to a desired location of the painted bodies;

determining whether a maximum absolute value of the read signal is greater than a noise threshold;

computing a measure based on an option;

determining whether the computed measure is less than a predetermined threshold if the measure is computed based on the error option and greater than a predetermined threshold if the measure is computed based on the correlation option;

incrementing a count if the computed measure is less than the predetermined threshold based on the error option or above the predetermined threshold based on the correlation option;

determining whether the waveform number is greater than a predetermined number of stable waveforms required before a stable result; and concluding a stable signal from the PELT transducer if the waveform number is equal to the predetermined number of stable waveforms required and generating a trigger to capture the stable signal.

* * * * *